United States Patent
Inao et al.

(10) Patent No.: US 9,688,219 B2
(45) Date of Patent: Jun. 27, 2017

(54) WIRE HARNESS

(71) Applicant: Yazaki Corporation, Minato-ku, Tokyo (JP)

(72) Inventors: Shinichi Inao, Makinohara (JP); Hideomi Adachi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/973,944

(22) Filed: Dec. 18, 2015

(65) Prior Publication Data

US 2016/0101746 A1    Apr. 14, 2016

Related U.S. Application Data

(63) Continuation of application No. PCT/JP2014/066346, filed on Jun. 19, 2014.

(30) Foreign Application Priority Data

Jun. 20, 2013 (JP) .................... 2013-129288

(51) Int. Cl.
*B60R 16/02* (2006.01)
*H02G 3/04* (2006.01)
(Continued)

(52) U.S. Cl.
CPC ....... *B60R 16/0215* (2013.01); *H02G 3/0468* (2013.01); *H02G 3/0616* (2013.01); *H02G 3/32* (2013.01)

(58) Field of Classification Search
CPC ................................................ B60R 16/0215
(Continued)

(56) References Cited

U.S. PATENT DOCUMENTS 7,094,970 B2    8/2006    Kihira
7,497,284 B2    3/2009    Yamaguchi et al.
(Continued)

FOREIGN PATENT DOCUMENTS

CN    1667898 A    9/2005
CN    102035155 A    4/2011
(Continued)

OTHER PUBLICATIONS

Sep. 22, 2014—International Search Report—Intl App PCT/JP2014/66346.
(Continued)

*Primary Examiner* — Timothy Thompson
*Assistant Examiner* — Charles Pizzuto
(74) *Attorney, Agent, or Firm* — Banner & Witcoff, Ltd.

(57) ABSTRACT

A wire harness includes a conductive path and an exterior member with a tubular shape which covers the conductive path. The exterior member includes a bent route portion and a straight route portion with a straight shape. The straight route portion includes a first straight tubular portion; a second straight tubular portion; a third straight tubular portion that is disposed between the first straight tubular portion and the second straight tubular portion; and a shift correction portion that allows the third straight tubular portion to be displaced relative to the first straight tubular portion and the second straight tubular portion in a perpendicular axial direction of the straight route portion.

5 Claims, 4 Drawing Sheets

(51) Int. Cl.
*H02G 3/06* (2006.01)
*H02G 3/32* (2006.01)

(58) Field of Classification Search
USPC ........................................... 174/72 A
See application file for complete search history.

(56) References Cited

U.S. PATENT DOCUMENTS

| | | | |
|---|---|---|---|
| 2004/0099427 A1 | 5/2004 | Kihira | |
| 2005/0162015 A1 | 7/2005 | Yamaguchi et al. | |
| 2011/0067920 A1 | 3/2011 | Toyama et al. | |
| 2014/0110011 A1* | 4/2014 | Omura | H02G 3/0468 138/109 |
| 2015/0224945 A1* | 8/2015 | Inao | B60R 16/0207 174/72 A |
| 2016/0217886 A1 | 7/2016 | Toyama et al. | |

FOREIGN PATENT DOCUMENTS

| | | |
|---|---|---|
| JP | 2004-171952 A | 6/2004 |
| JP | 2006-185927 A | 7/2006 |
| JP | 2009-143326 A | 7/2009 |
| JP | 2013-017317 A | 1/2013 |
| WO | 93/18565 A1 | 9/1993 |
| WO | WO 93/18565 * | 9/1993 |

OTHER PUBLICATIONS

Dec. 30, 2015—(WO) Int'l Prelim Report on Patentability & Written Opinion—Intl App PCT/JP2014/066346.
Dec. 29, 2016—(CN) Notification of the First Office Action—App 201480035436.2.
Feb. 17, 2017—(JP) Notification of Reasons for Refusal—App 2013-129288.

* cited by examiner

WIRE HARNESS

CROSS REFERENCE TO RELATED APPLICATIONS

This application is a continuation of PCT application No. PCT/JP2014/066346, which was filed on Jun. 19, 2014 based on Japanese Patent Application (No. 2013-129288) filed on Jun. 20, 2013, the contents of which are-incorporated herein by reference.

BACKGROUND OF THE INVENTION

1. Field of the Invention

One or more embodiments of the present invention relate to a wire harness including a conductive path and an exterior member.

2. Description of the Related Art

A wire harness disclosed in the related art electrically connects devices that are mounted in a hybrid vehicle or an electric vehicle and are driven at a high voltage. A wire harness disclosed in below-described PTL1 includes a plurality of high-voltage conductive paths and a metallic exterior member for protecting the high-voltage conductive paths.

CITATION LIST

Patent Literature

PTL 1 is JP-A-2004-171952.

SUMMARY OF THE INVENTION

In the related art, the exterior member of the wire harness is hard. For this reason, if a positional shift occurs between a plurality of clamps provided on the exterior member and a plurality of stud bolts provided in the vehicle when a long straight portion of the wire harness is fixed to the vehicle, the attachment and fixation of the wire harness becomes difficult, and as a result, workability is adversely affected.

Specifically, when at least three fixation points are present, and a positional shift occurs at a middle fixation point, the aforementioned attachment and fixation operation becomes difficult, and thus the workability is adversely affected.

One or more embodiments of the present invention are made in light of the above, and an object thereof is to provide a wire harness that can be attached and fixed to a vehicle with excellent workability.

In order to achieve this object, a wire harness according to the embodiments of the present invention has characteristics in (1) to (4) hereinbelow.

(1) In a wire harness including a conductive path and an exterior member with a tubular shape which covers the conductive path, the exterior member includes a bent route portion and a straight route portion with a straight shape, and the straight route portion includes a first straight tubular portion; a second straight tubular portion; a third straight tubular portion that is disposed between the first straight tubular portion and the second straight tubular portion; and a shift correction portion that allows the third straight tubular portion to be displaced relative to the first straight tubular portion and the second straight tubular portion in a perpendicular axial direction of the straight route portion.

(2) In the wire harness described in (1), a fixing portion is provided in each of the first straight tubular portion, the second straight tubular portion, and the third straight tubular portion, and is fixed to a fixation target at a routing destination.

(3) In the wire harness described in (1) or (2), the amount of displacement of the third straight tubular portion relative to the first straight tubular portion and the second straight tubular portion due to the shift correction portion is set within a range of a width dimension of the straight route portion.

(4) In the wire harness described in any one of (1) to (3), the exterior member is formed to have a length so as to straddle the front and the rear of a vehicle underfloor via the vehicle underfloor, and the straight route portion is disposed and formed conforming to at least a position of the vehicle underfloor.

According to the embodiments of the present invention having these characteristics, it is possible to correct a positional shift occurring in a portion of the straight route portion. When at least three fixation points are present in the straight route portion, and a positional shift occurs at a middle fixation point, it is possible to absorb the positional shift by virtue of displacement by the shift correction portion.

According to the embodiments of the present invention, it is possible to correct a positional shift occurring in a portion of the straight route portion. When a plurality of fixation points is present in the straight route portion, a positional shift of a fixation point, the position of which is shifted, is absorbed by displacement by the shift correction portion, and thus a wire harness can be attached and fixed to a vehicle with excellent workability.

In addition, it is possible to ensure a sufficient amount of displacement required to absorb a positional shift of a fixation point.

DESCRIPTION OF EMBODIMENT

Figure 1:
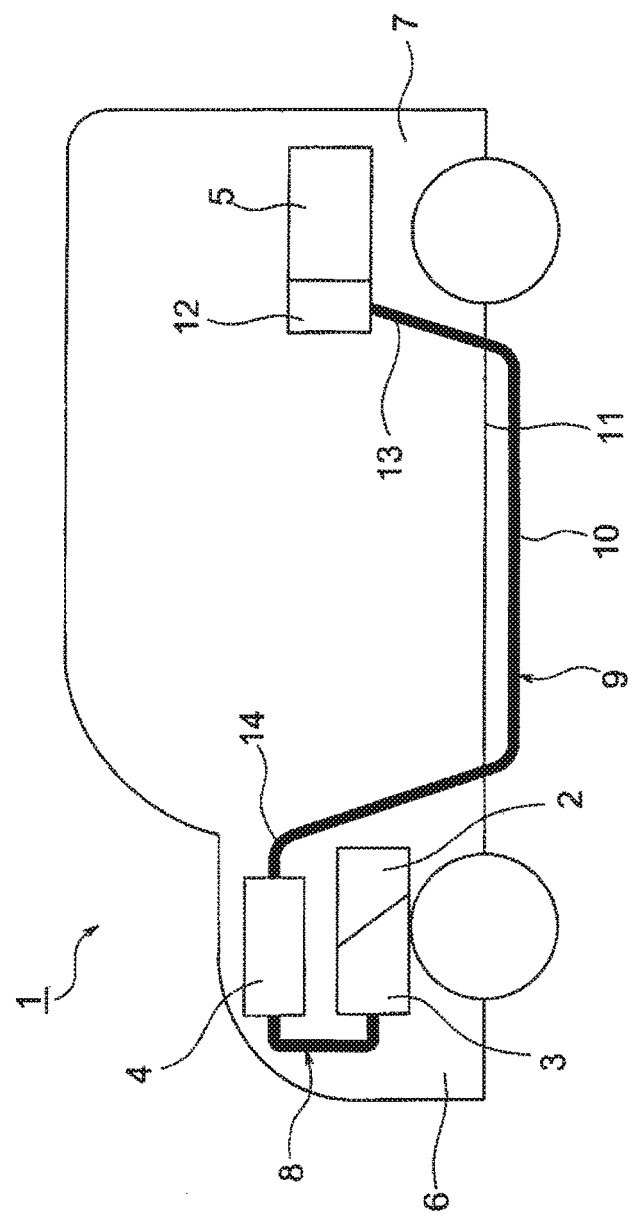
FIG. 1 is a view schematically illustrating a routing state or a wire harness in an embodiment of the present invention.
Figure 2:
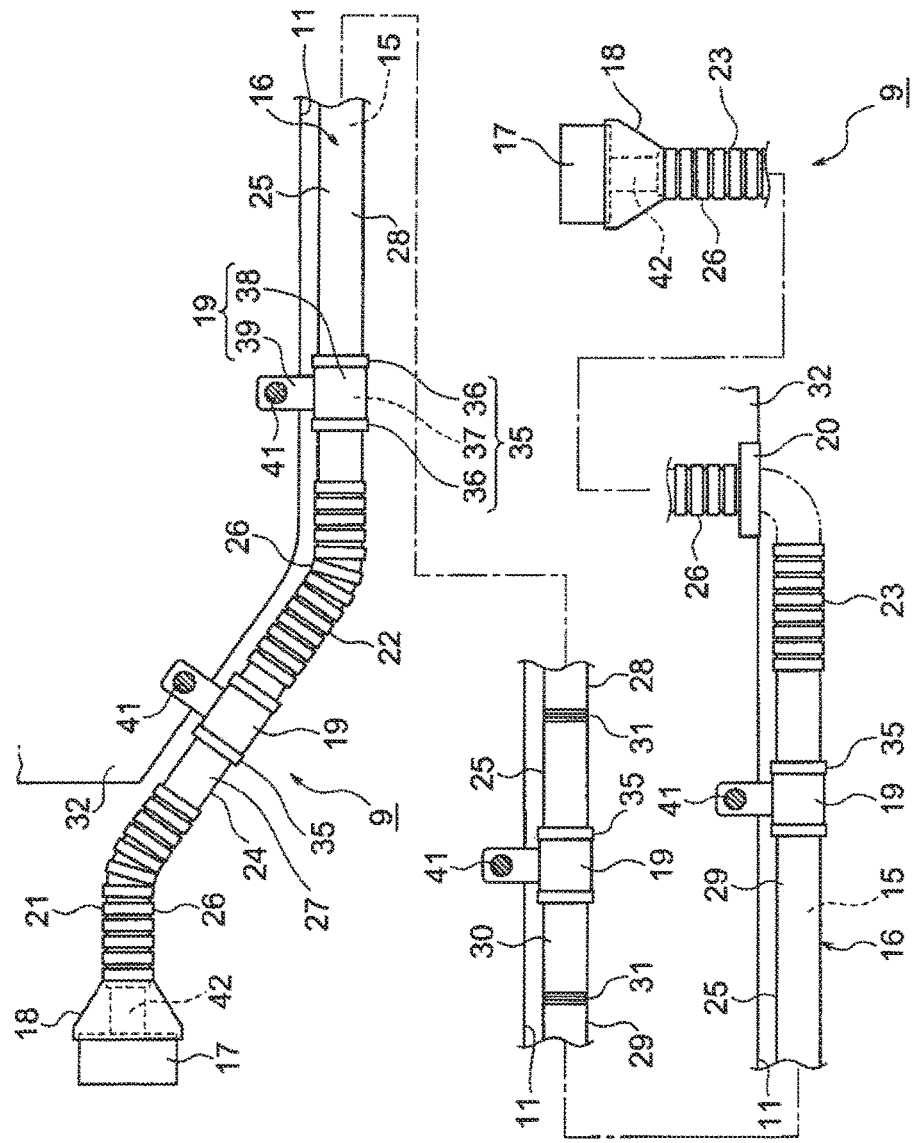
FIG. 2 is a view illustrating a state in which the wire harness is attached and fixed to a vehicle.
Figure 3:
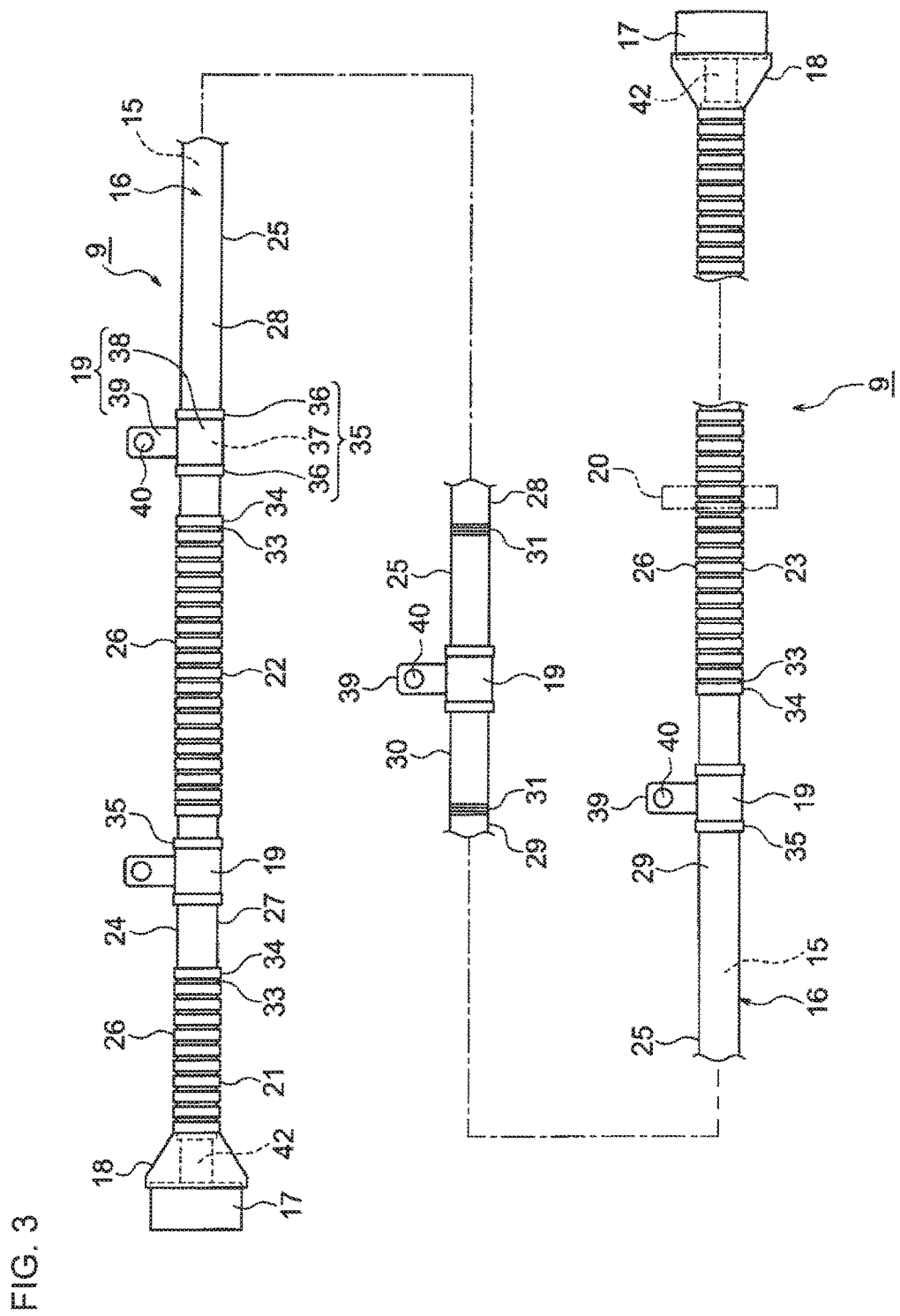
FIG. 3 is a view illustrating a configuration of the wire harness.
Figure 4:
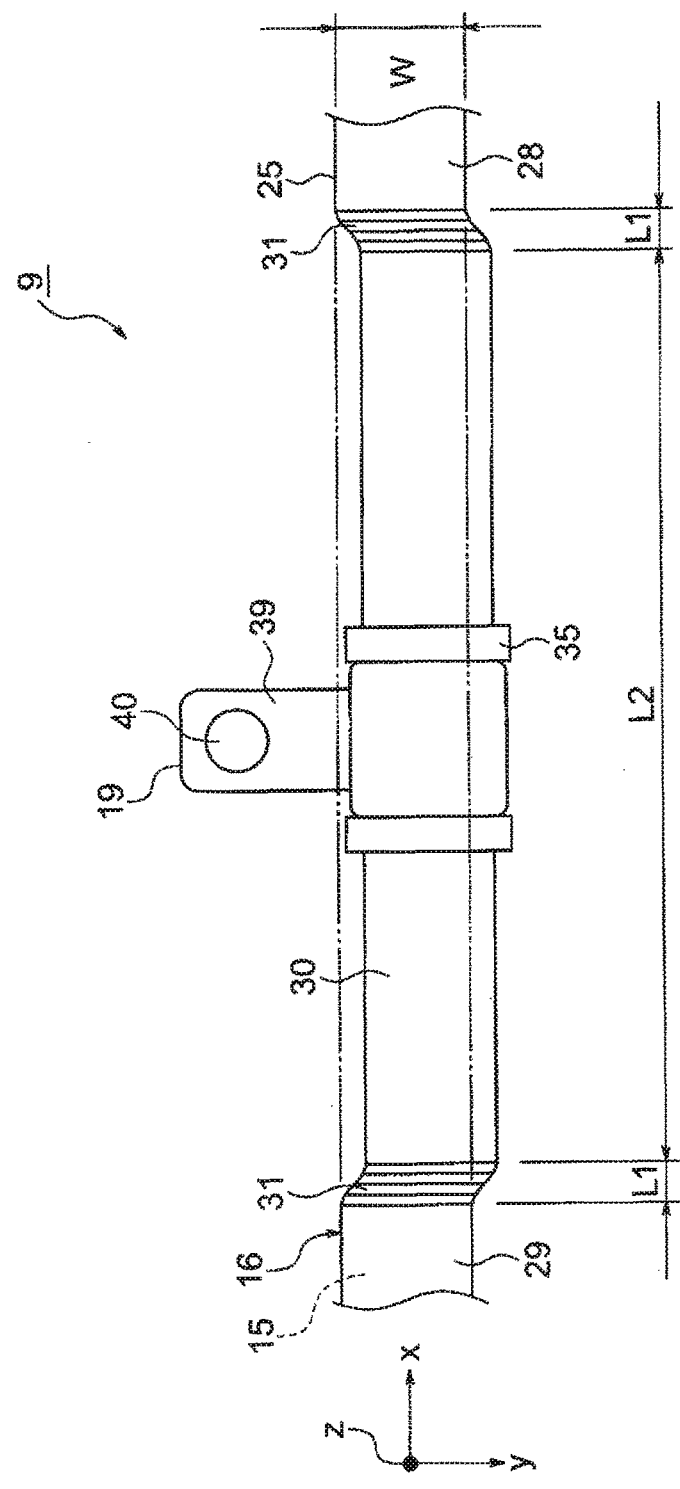
FIG. 4 is a view illustrating an operation of shift correction portions.

Hereinafter, a wire harness in an embodiment of the present invention will be described with reference to the accompanying drawings. FIG. 1 is a view schematically illustrating a routing state of the wire harness in the embodiment. FIG. 2 is a view illustrating a state in which the wire harness is attached and fixed to a vehicle, FIG. 3 is a view illustrating the configuration of the wire harness, and FIG. 4 is a view illustrating an operation of shift correction portions. The wire harness includes one or a plurality of conductive paths, and an exterior member that accommodates and protects the conductive paths. The wire harness has a long length so as to pass along a vehicle underfloor. The exterior member includes a bent route portion and a straight route portion. The straight route portion includes a shift correction portion that displaces a straight tubular portion, and a positional shift at a fixation point is absorbed by the shift correction portion.

In the embodiment, the present invention is applied to a wire harness to be routed in a hybrid vehicle (which may be an electric vehicle or a typical automobile).

In FIG. 1, a hybrid vehicle 1 includes two power sources, that is, an engine 2 and a motor unit 3, and is driven by a combination of power from these power sources. Electric power is supplied from a battery (battery pack) 5 to the motor unit 3 via an inverter unit 4. In the embodiment, the engine 2, the motor unit 3, and the inverter unit 4 are mounted in an engine compartment 6 in the vicinity of the front wheels. The battery 5 is mounted in a vehicle rear portion 7 in the vicinity of the rear wheels (may be mounted in a vehicle interior that is present on the rear side of the engine compartment 6).

The motor unit 3 is connected to the inverter unit 4 via a high-voltage wire harness 8. The battery 5 is connected to the inverter unit 4 via a high-voltage wire harness 9. An intermediate portion 10 of the wire harness 9 is routed on a vehicle underfloor 11. The wire harness 9 is routed along the vehicle underfloor 11 while being substantially parallel thereto. The vehicle underfloor 11 is a known body and a so-called panel member, and a through hole is formed at a predetermined position in the vehicle underfloor 11. The wire harness 9 is water-tightly inserted into the through hole.

The wire harness 9 is connected to the battery 5 via a junction block 12 provided in the battery 5. A rear end 13 of the wire harness 9 is electrically connected to the junction block 12 by a known method. A front end 14 of the wire harness 9 is electrically connected to the inverter unit 4 by a known method.

The motor unit 3 serves as both a motor and a generator. The inverter unit 4 includes an inverter and a converter. The motor unit 3 is a motor assembly including a shielded case. The inverter unit 4 is an inverter assembly including a shielded case. The battery 5 is a Ni-MH battery or a Li-ion battery, and is built as a module. A power storage device such as a capacitor can also be used as the battery 5. Insofar as the battery 5 can be used in the hybrid vehicle 1 or an electric vehicle, the battery 5 is not limited to a specific type of battery.

In FIGS. 2 and 3, the wire harness 9 includes one or a plurality of high-voltage conductive paths (conductive paths) 15; an exterior member 16 that accommodates and protects the high-voltage conductive paths 15; a shielded connector 17 provided at an end of the high-voltage conductive paths 15; a boot 18 provided to straddle the shielded connector 17 and the exterior member 16; a plurality of clamps (fixing portions) 19 attached to an external surface of the exterior member 16; and a grommet 20 attached to the external surface of the exterior member 16.

The wire harness 9 may have a configuration in which a low-voltage conductive path along with the high-voltage conductive path 15 is accommodated in and protected by the exterior member 16.

The high-voltage conductive path 15 is a high-voltage conductive path, and includes two high-voltage circuits (not specifically illustrated), and a shield member that covers the two high-voltage circuits. The two high-voltage circuits are formed to have a length required for electrical connection. The two high-voltage circuits are formed to have a long length in order for the wire harness 9 to electrically connect the inverter unit 4 and the battery 5 (the junction block 12) together (refer to FIG. 1).

Examples of the high-voltage circuit include a known high-voltage electric wire, shielded electric wire, and busbar over which an insulator is provided. The high-voltage circuit is not limited to a specific type of high-voltage circuit. One or a plurality of electric wires or busbars with insulators may be included. Another example is a high-voltage coaxial composite conductive path with a configuration in which a positive circuit and a negative circuit are coaxially provided, or a high-voltage coaxial composite conductive path with a configuration in which three or more circuits are coaxially provided.

The exterior member 16 is a tube made of resin which covers the high-voltage conductive path 15. The exterior member 16 has a length required to allow the high-voltage conductive path 15 to be inserted thereinto and accommodated therein, and a thickness required to protect the high-voltage conductive path 15. The exterior member 16 is formed to have a long length so as to straddle the front and the rear of the vehicle underfloor 11 via the vehicle underfloor 11. The material of the exterior member 16 is not limited to resin, and may be metal.

The exterior member 16 includes bent route portions 21, 22, and 23 as portions being routed in a bent form, and straight route portions 24 and 25 as portions being straightly routed, and for example, the exterior member is formed to have the illustrated shape. Each of the bent route portions 21 to 23 is formed in a flexible tubular portion 26 that can be flexed. The exterior member 16 is molded of resin such that the bent route portions 21 to 23 and the straight route portions 24 and 25 become straight when the flexible tubular portions 26 are not flexed. The exterior member 16 has a substantially rectangular section, a substantially circular section, a substantially long circular section, a substantially elliptical section, or the like. That is, a section shape is appropriately selected according to the purpose of usage.

The straight route portion 24 is formed in a straight tubular portion 27 having rigidity higher than that of the flexible tubular portions 26 of the bent route portions 21 to 23. In contrast, the straight route portion 25 is formed in each of a first straight tubular portion 28, a second straight tubular portion 29, a third straight tubular portion 30, and a pair of shift correction portions 31, all of which have rigidity higher than that of the flexible tubular portion 26. The straight route portion 25 is formed as a route portion longer than the straight route portion 24.

The bent route portions 21 to 23 are disposed and formed conforming to a vehicle attachment shape (a shape of a routing destination of the wire harness, that is, the shape of a fixation target 32). Specifically, the bent route portions 21 to 23 are disposed and formed conforming to sections that require the bending of the exterior member 16. Each of the bent route portions 21 to 23 is formed to have a length required for bending. In the embodiment, only the bent route portion 23 is formed to have a long length.

The bent route portions 21 to 23 (the flexible tubular portions 26) are formed such that each of the bent route portions 21 to 23 can be flexed at a desired angle when the wire harness 9 is packed, transported, or routed along a path in a vehicle (is attached and fixed to the vehicle), that is, after the wire harness 9 is manufactured (refer to FIG. 2).

Each of the bent route portions 21 to 23 (the flexible tubular portions 26) can be flexed into a desired bent shape, and restored to an original non-flexed shape.

In the embodiment, the bent route portions 21 to 23 (the flexible tubular portions 26) are formed in the shape of a bellows tube (insofar as each of the bent route portions 21 to 23 is flexible, each of the bent route portions 21 to 23 is not limited to a specific shape). Specifically, each of the bent route portions 21 to 23 includes a plurality of circumferential concave portions 33 and a plurality of circumferential convex portions 34 which are consecutively but alternately formed in a direction of the tube axis (in an extension direction of the high-voltage conductive path 15).

As can be understood from the aforementioned description, each of the portions, in which the bent route portions 21 to 23 are disposed, is shaped like a corrugated tube. In other words, the exterior member 16 is partially shaped like a corrugated tube. The exterior member 16 has the portions shaped like a corrugated tube as described above, and thus the exterior member 16 is also referred to as a "corrugated tube", a "partially corrugated tube", or the like.

In contrast, the straight route portions 24 and 25 are formed as portions not being bent when the wire harness 9 is packed, transported, or routed in a path (the non-bent portion is a portion that is not actively formed to be flexible). Each of the straight route portions 24 and 25 is positioned and has a length conforming to the vehicle attachment shape (the shape of the fixation target 32).

The long straight route portion 25 is disposed and formed conforming to a position of the vehicle underfloor 11. The straight route portion 24 shorter than the straight route portion 25 is disposed and formed close to the front end 14 of the wire harness 9 while being positioned between the bent route portions 21 and 22, and being continuous with the bent route portions 21 and 22.

The straight tubular portion 21 of the short straight route portion 24 is formed in the shape of a straight tube (in a straight tubular shape). The straight tubular portion 27 is formed to have rigidity. Accordingly, the straight tubular portion 27 can be referred to as a "straight tubular portion", a "rigid portion", or the like. An attachment portion 35 is formed integrally with the straight tubular portion 27.

The attachment portion 35 is formed as a portion to which the clamp 19 is attached. The attachment portion 35 includes a pair of movement restricting portions 36, and an attachment and detachment portion 37. The pair of movement restricting portions 36 are formed as portions that restrict the movement of the clamp 19 in the direction of the tube axis. The pair of movement restricting portions 36 are formed as portions through which an attachment position of the clamp 19 can be recognized. In the embodiment, the pair of movement restricting portions 36 are formed in the shape of an annular flange. The attachment and detachment portion 37 is formed as a portion to which the clamp 19 is directly attached.

The long straight route portion 25 includes the first straight tubular portion 28 that is continuous with the bent route portion 22; the second straight tubular portion 29 that is continuous with the bent route portion 23; the third straight tubular portion 30 that is disposed between the first straight tubular portion 28 and the second straight tubular portion 29; and the pair of shift correction portions 31 that are respectively disposed at both ends of the third straight tubular portion 30, and is respectively continuous with the first straight tubular portion 28 and the second straight tubular portion 29.

The first straight tubular portion 28, the second straight tubular portion 29, and the third straight tubular portion 30 are formed in the shape of a straight tube (in a straight tubular shape). The first straight tubular portion 28, the second straight tubular portion 29, and the third straight tubular portion 30 are formed to have rigidity. Each of the first straight tubular portion 28, the second straight tubular portion 29, and the third straight tubular portion 30 is formed integrally with the attachment portion 35. Accordingly, the first straight tubular portion 28, the second straight tubular portion 29, and the third straight tubular portion 30 are formed to be similar to the straight tubular portion 27.

As illustrated in FIG. 4, the pair of shift correction portions 31 is formed as portions that allow the third straight tubular portion 30 to be displaced relative to the first straight tubular portion 28 and the second straight tubular portion 29 in a perpendicular axial direction of the straight route portion 25 (a direction of arrow x and a direction of arrow y are respectively as an axial direction and the perpendicular axial direction of the straight route portion 25). In the embodiment, the pair of shift correction portions 31 can be displaced in the range of a width dimension W of the straight route portion 25 (insofar as a positional shift (to be described later) can be absorbed, the amount of displacement to be ensured is not specifically limited).

Unlike the flexible tubular portions 26 (refer to FIGS. 2 and 3) of the bent route portions 21 to 23, the pair of shift correction portions 31 is not actively formed to be flexible. In the embodiment, each of the shift correction portions 31 is formed substantially in the shape of a bellows, but has a shape different from that of the flexible tubular portions 26. The pair of shift correction portions 31 may be a thin-wall portion. That is, the pair of shift correction portions 31 may have slight pliability or slight flexibility compared to the first straight tubular portion 28, the second straight tubular portion 29, and the third straight tubular portion 30.

A formation length dimension L1 of the pair of shift correction portions 31 is set while taking a length dimension L2 of the third straight tubular portion 30, the width dimension W of the straight route portion 25, and the aforementioned required amount of displacement into consideration.

Returning to FIGS. 2 and 3, a known clamp is used as the clamp 19 attached to the attachment portion 35. Each of the clamps 19 includes a tube attachment portion 38, and a cantilever-like fixing portion 39 that is continuous with the tube attachment portion 38. A bolt insertion hole 40 is formed in the fixing portion 39 in such a way as to pass therethrough. The insertion hole 40 is shaped such that a stud bolt 41 provided in the fixation target 32 is capable of engaging into the insertion hole 40. The clamp 19 and the stud bolt 41 are fixation points. In the drawings, orientations of the fixing portions 39 or the stud bolts 41 are changed for the sake of convenience.

Known products are used as the shielded connector 17, the boot 18, and the grommet 20. For this reason, detailed descriptions thereof will not be given.

The wire harness 9 with the aforementioned configuration and structure is manufactured in the following manner (not illustrated). That is, the wire harness 9 is manufactured by inserting the high-voltage conductive path 15 into one end of the exterior member 16 up to the other end thereof with the exterior member 16 being molded of resin and substantially straight throughout its entire length. The wire harness 9 is manufactured by further attaching the clamps 19 and the grommet 20 to the external surface of the exterior member 16 at predetermined positions. The wire harness 9 is manufactured by further providing the shielded connectors 17 in end portions 42 of the high-voltage conductive path 15, respectively. The wire harness 9 is manufactured by further attaching each of the boots 18 so as to straddle the exterior member 16 and the shielded connector 17.

After the manufacturing of the wire harness 9 is completed as described above, when the wire harness 9 is bent such that the predetermined flexible tubular portions 26 are folded, the wire harness 9 is completely brought into a packed state. The wire harness 9 in a packed state is compact, and the wire harness 9 is transported to a vehicle assembly site in such a compact state.

At the vehicle assembly site, the attachment of the wire harness 9 to the vehicle starts with the long portions of the wire harness 9 corresponding to the vehicle underfloor 11, that is, the straight route portions 25. The attachment of the wire harness 9 starts with the straight route portions 25 corresponding to the vehicle underfloor 11, and thus the attachment of the wire harness 9 starts in a state where the wire harness 9 is restrained from being flexed. In this case, the attachment of the wire harness 9 is performed with excellent workability.

When a positional shift occurs at a fixation point, the positional shift may be absorbed by displacements (refer to FIG. 4) of the pair of shift correction portions 31. Due to the positional shift being absorbed, the clamps 19 are easily attached to the respective stud bolts 41. Due to the positional shift being absorbed, inconvenient adjustment is prevented from being performed, or the wire harness 9 is prevented from being treated as a defective product.

After the long portion corresponding to the vehicle underfloor 11 is fixed using the clamps 19 and the stud bolts 41, the remainders of the wire harness 9 are attached while the flexible tubular portions 26 of the exterior member 16 are flexed (bent). When a series of attachment operations are completed, the wire harness 9 is routed in a desired path.

As has been described with reference to FIGS. 1 to 4, the wire harness 9 of the present invention includes the high-voltage conductive path 15, and the exterior member 16 that accommodates and protects the high-voltage conductive path 15. The wire harness 9 has a long length so as to pass along the vehicle underfloor 11. The exterior member 16 includes the bent route portions 21 to 23 and the straight route portions 24 and 25. Since the long straight route portion 25 includes the pair of shift correction portions 31 that allow a middle straight tubular portion among the three straight tubular portions, that is, the third straight tubular portion 30 to be displaced, when a positional shift occurs at a fixation point while the wire harness 9 is attached and fixed, the positional shift can be absorbed by the pair of shift correction portions 31. Accordingly, the attachment and fixation operation can be performed with excellent workability.

The characteristics of the wire harness in the embodiment of the present invention are collectively and briefly listed in [1] to [4] hereinbelow.

[1] In a wire harness (9) including a conductive path (15) and an exterior member (16) with a tubular shape which covers a conductive path (15), the exterior member (16) includes bent route portions (21, 22, and 23) and a straight route portion with a straight shape, and the straight route portion includes a first straight tubular portion (28); a second straight tubular portion (29); a third straight tubular portion (30) that is disposed between the first straight tubular portion (28) and the second straight tubular portion (29); and a shift correction portion (31) that allows the third straight tubular portion (30) to be displaced relative to the first straight tubular portion (28) and the second straight tubular portion (29) in a perpendicular axial direction of the straight route portion.

[2] In the wire harness (9) disclosed in [1], a fixing portion (19) is provided in each of the first straight tubular portion (28), the second straight tubular portion (29), and the third straight tubular portion (30), and is fixed to a fixation target at a routing destination.

[3] In the wire harness (9) disclosed in [1] or [2], the amount of displacement of the third straight tubular portion (30) relative to the first straight tubular portion (28) and the second straight tubular portion (29) due to the shift correction portions (31) is set within a range of a width dimension of the straight route portion.

[4] In the wire harness (9) disclosed in any one of [1] to [3], the exterior member (16) is formed to have a length so as to straddle the front and the rear of a vehicle underfloor (11) via the vehicle underfloor (11), and the straight route portion is disposed and formed conforming to at least a position of the vehicle underfloor (11).

The present invention has been described in detail with reference to the specific embodiment, and it is apparent to persons skilled in the art that modifications or corrections can be made to the present invention in various forms insofar as the modifications or the corrections do not depart from the spirit and the scope of the present invention.

It is possible to provide a wire harness that can be attached and fixed to a vehicle with excellent workability, which is the effect of the present invention. The present invention with such an effect is effectively applied to a wire harness that is configured to include a conductive path and an exterior member.

What is claimed is:

1. A wire harness comprising:
    a conductive path; and
    an exterior member with a tubular shape which covers the conductive path, wherein the exterior member includes a bent route portion and a straight route portion with a straight shape, and the straight route portion includes
        a first straight tubular portion;
        a second straight tubular portion;
        a third straight tubular portion that is disposed between the first straight tubular portion and the second straight tubular portion; and
        a pair of shift correction portions that allows the third straight tubular portion to be displaced relative to the first straight tubular portion and the second straight tubular portion in a perpendicular axial direction of the straight route portion,
    wherein the shift correction portions are more rigid than the bent route portion.

2. The wire harness according to claim 1, wherein a fixing portion is provided in each of the first straight tubular portion, the second straight tubular portion, and the third straight tubular portion, and is fixed to a fixation target at a routing destination.

3. The wire harness according to claim 1, wherein an amount of displacement of the third straight tubular portion relative to the first straight tubular portion and the second straight tubular portion due to the shift correction portions is set within a range of a width dimension of the straight route portion.

4. The wire harness according to claim 1, wherein the exterior member is formed to have a length so as to straddle a front and a rear of a vehicle underfloor via the vehicle underfloor, and the straight route portion is disposed and formed conforming to at least a position of the vehicle underfloor.

5. The wire harness according to claim 1, wherein the shift correction portions have a shape different from the bent route portion.

* * * * *